US008010538B2

(12) United States Patent
Pedersen

(10) Patent No.: US 8,010,538 B2
(45) Date of Patent: Aug. 30, 2011

(54) METHODS AND SYSTEMS FOR REPORTING REGIONS OF INTEREST IN CONTENT FILES

(75) Inventor: Palle Martin Pedersen, Brookline, MA (US)

(73) Assignee: Black Duck Software, Inc., Waltham, MA (US)

( * ) Notice: Subject to any disclaimer, the term of this patent is extended or adjusted under 35 U.S.C. 154(b) by 823 days.

(21) Appl. No.: 11/429,928

(22) Filed: May 8, 2006

(65) Prior Publication Data
US 2007/0260651 A1 Nov. 8, 2007

(51) Int. Cl.
G06F 7/06 (2006.01)
G06F 17/30 (2006.01)
(52) U.S. Cl. .................. 707/749; 707/758; 707/713
(58) Field of Classification Search .................. 707/204, 707/6, 999.006, 999.204, 758, 713, 749; 356/71
See application file for complete search history.

(56) References Cited

U.S. PATENT DOCUMENTS

| 5,313,616 | A | 5/1994 | Cline et al. |
|---|---|---|---|
| 5,343,527 | A | 8/1994 | Moore |
| 5,469,354 | A | 11/1995 | Hatakeyama et al. |
| 5,577,249 | A | 11/1996 | Califano |
| 5,765,152 | A | 6/1998 | Erickson |
| 5,774,883 | A | 6/1998 | Andersen et al. |
| 5,892,900 | A | 4/1999 | Ginter et al. |
| 5,893,095 | A | 4/1999 | Jain et al. |
| 5,917,912 | A | 6/1999 | Ginter et al. |
| 5,953,006 | A * | 9/1999 | Baker et al. .................. 715/700 |
| 5,958,051 | A | 9/1999 | Renaud et al. |
| 6,029,002 | A | 2/2000 | Afifi et al. |
| 6,035,402 | A | 3/2000 | Vaeth et al. |
| 6,072,493 | A | 6/2000 | Driskell et al. |
| 6,148,401 | A | 11/2000 | Devanbu et al. |
| 6,189,146 | B1 | 2/2001 | Misra et al. |
| 6,226,618 | B1 | 5/2001 | Downs et al. |
| 6,240,409 | B1 | 5/2001 | Aiken |
| 6,249,769 | B1 | 6/2001 | Ruffin et al. |
| 6,260,141 | B1 | 7/2001 | Park et al. |
| 6,263,348 | B1 | 7/2001 | Kathrow et al. |
| 6,275,223 | B1 | 8/2001 | Hughes et al. |
| 6,282,698 | B1 | 8/2001 | Baker et al. |
| 6,330,670 | B1 | 12/2001 | England et al. |
| 6,381,698 | B1 | 4/2002 | Devanbu et al. |

(Continued)

FOREIGN PATENT DOCUMENTS
WO WO-/2002/27486 4/2002

OTHER PUBLICATIONS

Introduction document to the book "Analysing for Authorship: A Guide to the Cusum Technique" by Jill M Farringdon, at website http://members.aol.com/qsums/ and then the Introduction link from that page, web pages dated Oct. 13, 2004, via The Wayback Machine www.archive.org.*

(Continued)

Primary Examiner — James Trujillo
Assistant Examiner — Bruce M Moser
(74) Attorney, Agent, or Firm — Goodwin Procter LLP

(57) ABSTRACT

A content file is examined and compared against one or more comparison files. An indication is provided that the content file is similar to the one comparison file that is the best match with the examined content file.

22 Claims, 8 Drawing Sheets

U.S. PATENT DOCUMENTS

| | | | |
|---|---|---|---|
| 6,393,438 B1 | 5/2002 | Kathrow et al. | |
| 6,397,205 B1 | 5/2002 | Juola | |
| 6,480,834 B1 | 11/2002 | Engle et al. | |
| 6,480,959 B1 | 11/2002 | Granger et al. | |
| 6,493,709 B1 | 12/2002 | Aiken | |
| 6,546,114 B1 | 4/2003 | Venkatesan et al. | |
| 6,557,105 B1 | 4/2003 | Tardo et al. | |
| 6,574,348 B1 | 6/2003 | Venkatesan et al. | |
| 6,658,626 B1 | 12/2003 | Aiken | |
| 6,862,696 B1 | 3/2005 | Voas et al. | |
| 6,954,747 B1 | 10/2005 | Wang et al. | |
| 6,976,170 B1 | 12/2005 | Kelly | |
| 6,983,371 B1 | 1/2006 | Hurtado et al. | |
| 7,197,156 B1* | 3/2007 | Levy | 382/100 |
| 7,254,587 B2* | 8/2007 | Lee et al. | 707/104.1 |
| 7,734,627 B1* | 6/2010 | Tong | 707/737 |
| 2002/0065781 A1 | 5/2002 | Hillegass et al. | |
| 2002/0138441 A1 | 9/2002 | Lopatic | |
| 2002/0138477 A1* | 9/2002 | Keiser | 707/3 |
| 2002/0138764 A1 | 9/2002 | Jacobs et al. | |
| 2002/0188608 A1 | 12/2002 | Nelson et al. | |
| 2002/0194010 A1 | 12/2002 | Bergler et al. | |
| 2003/0018891 A1 | 1/2003 | Hall et al. | |
| 2003/0074163 A1 | 4/2003 | Anand et al. | |
| 2003/0079174 A1 | 4/2003 | Hooks | |
| 2003/0126456 A1 | 7/2003 | Birzer et al. | |
| 2003/0163684 A1 | 8/2003 | Fransdonk | |
| 2003/0167236 A1 | 9/2003 | Stefik et al. | |
| 2003/0172035 A1 | 9/2003 | Cronce et al. | |
| 2004/0162827 A1 | 8/2004 | Nakano | |
| 2005/0015343 A1 | 1/2005 | Nagai et al. | |
| 2005/0060643 A1 | 3/2005 | Glass et al. | |
| 2005/0065930 A1 | 3/2005 | Swaminathan et al. | |
| 2005/0114840 A1 | 5/2005 | Zeidman | |
| 2005/0125358 A1 | 6/2005 | Levin et al. | |
| 2005/0125359 A1 | 6/2005 | Levin et al. | |
| 2005/0166094 A1 | 7/2005 | Blackwell et al. | |
| 2005/0216898 A1 | 9/2005 | Powell et al. | |
| 2006/0015465 A1 | 1/2006 | Kume et al. | |
| 2006/0031686 A1 | 2/2006 | Atallah et al. | |
| 2006/0107070 A1 | 5/2006 | Rice et al. | |
| 2006/0122983 A1 | 6/2006 | King et al. | |
| 2006/0155975 A1 | 7/2006 | Mueller | |
| 2007/0157311 A1 | 7/2007 | Meier et al. | |
| 2007/0162890 A1 | 7/2007 | Meier et al. | |
| 2007/0299825 A1* | 12/2007 | Rush et al. | 707/3 |
| 2009/0171958 A1* | 7/2009 | Anderson, IV | 707/6 |

OTHER PUBLICATIONS

Clifford, et al, "A Fast, Randomised, Maximal Subset Matching Algorithm for Document-Level Music retrieval," SOFSEM '07 Proceedings of the 33rd conference on Current Trends in Theory and Practice of Computer Science, copyright 2006 University of Victoria.*

"ASAP eSMART Overview," ASAP Software, 1999-2002, pp. 1-2.

"Cleanscape lint jump page," Cleanscape Software International, [retrieved Nov. 26, 2003], Retrieved from the Internet: <http://www.cleanscape.net/products/lintonline/login.html>, 1 page.

"Code Analysis Settings," Ascension Labs, LLC, [retrieved Nov. 26, 2003]. Retrieved from the Internet: <http://www.ascensionlabs.com/pbca_CodeAnalysisSettings.htm>, 1 page.

"Creating a LIDESC_TAGS string," Librock LIDESC Software License Analyzer and Compatibility Reporter, [retrieved Nov. 26, 2003], Retrieved from the Internet: <http://www.mibsoftware.com/librock/lidesc/tags.htm>, pp. 1-9.

"GPL Compliance Toolset," Metroworks, [retrieved Nov. 26, 2003], Retrieved from the Internet: <http://www.metrowerks.com/MW/Develop/Embedded/Linux/GPLCT.htm>, pp. 1-2.

"How LIDESC Identifies Licensing of a File" [retrieved Jul. 18, 2003], Retrieved from the Internet: <http://www.mibsoftware.com/librock/lidesc/stamp.htm>, 23 pages.

"License Database 1.0," TapTopFolder, [retrieved Nov. 26, 2003], Retrieved from the Internet: <http://www.systemconsulting.co.uk/index.php?page=software/products/licensedb.html>, 1 page.

"Licensing," Open Source Initiative OSI, [retrieved Nov. 26, 2003], Retrieved from the Internet: < http://www.opensource.org/licenses/index.php>, pp. 1-2.

"LIDESC: Librock License Awareness System," Librock LIDESC Software License Analyzer and Compatibility Reporter, [retrieved Nov. 26, 2003], Retrieved from the Internet: <http://www.mibsoftware.com/librock/lidesc>, pp. 1-2.

"Lineo launches 'anti-FUD' campaign with license ID tool," Lineo, Inc. [retrieved Nov. 26, 2003], Retrieved from the Internet: <http://www.linuxdevices.com/news/NS6538038/187.html>, pp. 1-4.

"Lineo's GPL Compliance Tool," Linux DevCenter, Oct. 4, 2001, http://linux.oreillynet.com/pub/a/linux/2001/10/04/lineo.html>, pp. 1-4.

"Microsoft Software Inventory Analyzer," Microsoft Software Asset Management, [retrieved Nov. 26 ,2003], Retrieved from the Internet: <http://www.microsoft.com/resources/sam/msia.mspx>, 1 page.

"Moss: A System for Detecting Software Plagiarism" [online]. Alex Aiken's Homepage [retrieved Nov. 4, 2005]. Retrieved from the Internet: <http://cs.berkeley.edu/~aiken/moss.html>, 2 pages.

"New utility helps prevent software license violations" NewsForge, OSDN Open Source Development Network, Inc., Apr. 24, 2002, [retrieved Nov. 26, 2003], Retrieved from the Internet: <http://www.linuxdevices.com/news/NS3340825769.html>, pp. 1-3.

"New utility helps prevent software license violations," NewsForge, OSDN Open Source Development Network, Inc., Apr. 23, 2002, [retrieved Nov. 26, 2003], Retrieved from the Internet: <http://www.newsforge.com/software/02/04/23/163211.shtml?tid=51>, pp. 1-3.

"News- Motorola picks Lineo for set-top box," ZDNet UK, Aug. 29, 2001, [retrieved Nov. 26, 2003], Retrieved from the Internet: <http://news.zdnet.co.uk/hardware/emergingtech/039020357,2093969,00.htm>, pp. 1-3.

"OSI Certification Mark and Program" Open Source Initiative OSI, [retrieved Nov. 26, 2003], Retrieved from the Internet: <http://www.opensource.org/docs/certification mark.php>, pp. 1-5.

"PB Code Analyzer," Ascension Labs, LLC, [retrieved Nov. 26, 2003], Retrieved from the Internet: <http://www.ascensionlabs.com/pbcodeanalyzer.htm>, pp. 1-5.

"Products," TapTopFolder, [retrieved Nov. 26, 2003], Retrieved from the Internet: <http://www.systemconsulting.co.uk/index.php?page=software/products.html>, 1 page.

"Query FTP Software License Database," The U.T. Houston Database of FTP Software Licenses, [retrieved Nov. 26, 2003], Retrieved from the Internet: <http://www.uth.tmc.edu/iaims/network/ftp.html>, 1 page.

"The Attribution Assurance License: Licensing," Open Source Initiative OSI, [retrieved Nov. 26, 2003], Retrieved from the Internet: <http://www.opensource.org/licenses/attribution.php>, pp. 1-3.

"The Open Source Definition," Open Source Initiative OSI, [retrieved Nov. 26, 2003], Retrieved from the Internet: <http://www.opensource.org/docs/definition.php>, pp. 1-4.

"Various Licenses and Comments about Them" GNU Project- Free Software Foundation (FSF), [retrieved Nov. 26, 2003], Retrieved from the Internet: <http://www.fsf.orgllicenses/license-list.html>, pp. 1-15.

"Write Me 4.1," TapTopFolder, [retrieved Nov. 26, 2003], Retrieved from the Internet: <http://www.systemconsulting.co.uk/index.php?page=software/products/writeme.html>, 1 page.

Arsenault et al., "Securely Available Credentials- Requirements", Network Working Group Request for Comments: 3157, Aug. 2001, [retrieved Nov. 26, 2003], Retrieved from the Internet: <http://ftp.rfc-editor.org/in-notes/rfc3157.txt>, pp. 1-19.

Cohen, "Recursive Hashing Functions for n-Grams", ACM Transactions on Information Systems, vol. 15, No. 3, Jul. 1997, pp. 291-320.

Damashek, "Gauging Similarity with n-Grams: Language-Independent Categorization of Text", Science, New Series, vol. 267, No. 5199, Feb. 10, 1995, pp. 843-848.

Eastlake et al, "US Secure Hash Algorithm 1 (SHA 1)", Network Working Group Request for Comments: 3174, Sep. 2001, [retrieved Nov. 26 ,2003]. Retrieved from the Internet: <http://ftp.rfc-editor.orglin-notes/rfc3174.txt>, pp. 1-21.

Fougner, "Public Key Standards and Licenses", Network Working Group Request for Comments: 1170, Jan. 1991, [retrieved Nov. 26, 2003], Retrieved from the Internet: <http://fto.rfc-editor.org/in-notes/rfc1170.txt>, pp. 1-2.
Gomulkiewicz, "How Copyleft Uses License Rights to Succeed in the Open Source Software Revolution and the Implications for Article 2B," Houston Law Review, 36:179, 1999, retrieved from HCUL.doc on Oct. 2, 2003, pp. 179-194.
Heckel et al., "A Technique for Isolating Differences Between Files", Communications of the ACM, vol. 21, No. 4, Apr. 1978, pp. 264-268.
Huitema, "An Experiment in DNS Based IP Routing," Network Working Group Request for Comments: 1383, Dec. 1992, [retrieved Nov. 26, 2003], Retrieved from the Internet: <http://ftp.rfc-editor.org/in-notes/rfc1383.txt>, pp. 1-14.
Johnson, "Identifying redundancy in source code using fingerprints," IBM Centre for Advanced Studies Conference, Proceedings of the 1993 conference of the Centre for Advanced Studies on Collaborative research: software engineering—vol. 1, 1993, pp. 171-183.
Office Action issued in related U.S. Appl. No. 10/728,173, mailed Jan. 28, 2008, 6 pages.
Office Action issued in related U.S. Appl. No. 10/728,174, mailed Jan. 25, 2008, 10 pages.
Office Action issued in related U.S. Appl. No. 11/084,063, mailed Sep. 21, 2008, 15 pages.
Pethia et al., "Guidelines for the Secure Operation of the Internet", Network Working Group Request for Comments: 1281, Nov. 1991, [retrieved Nov. 26, 2003], Retrieved from the Internet: <http://ftp.rfc-editor.org/in-notes/rfc1281.txt>, pp. 1-10.
Rescorla et al., "The Secure HyperText Transfer Protocol," Network Working Group Request for Comments: 2660, Aug. 1999, [retrieved Nov. 26, 2003], Retrieved from the Internet: <http://ftp.rfc-editor.org/in-notes/rfc2660.txt>, pp. 1-43.
Rivest, The MD5 Message-Digest Algorithm, Network Working Group Request for Comments: 1321, Apr. 1992, [retrieved Nov. 26, 2003], Retrieved from the Internet: <http://ftp.rfc-editor org/in-notes/rfc1321.txt>, pp. 1-20.
Self et al. "[fsl discuss] Automatic reporting of license terms," Apr. 28, 2002, [retrieved Nov. 26, 2003], Retrieved from the Internet: <http://lists.alt.org/pipermail/fsl-discuss/2002-April/000312.html>, pp. 1-3.
Self et al. "[fsl-discuss] Automatic reporting of license terms," Apr. 25, 2002, [retrieved Nov. 26, 2003], Retrieved from the Internet: <http://lists.alt.org/pipermail/fsl-discuss/2002-April/000309.html>, pp. 1-2.
Si et al., "CHECK: A Document Plagiarism Detection System", Symposium on Applied Computing, Proceedings of the 1997 ACM symposium on Applied computing, 1997, pp. 70-77.
Verco et al., "Plagiarism á la Mode: A Comparison of Automated Systems for Detecting Suspected Plagiarism", The Computer Journal, vol. 39, No. 9, 1996, pp. 741-750.
Written Opinion for related PCT Application No. PCT/US2004/040453, mailed Jun. 4 ,2006, 6 pages.
Written Opinion for related PCT Application No. PCT/US2006/008369, mailed Sep. 18, 2007, 4 pages.
Examination Report for related European Application No. 06737533.7, mailed Jan. 15, 2008, 2 pages.
Office Action issued in related U.S. Appl. No. 10/084,063, mailed May 1, 2008, 15 pages.
Clough, "Plagiarism in natural and programming languages: an overview of current tools and technologies", <http://www1.compaq.com/pressrelease/0,1494,wp%7E14583_2lob%7E29892_ 1_1.00.html>, pp. 1-31, Jun. 2000.
Prechelt et al., "Finding plagiarisms among a set of programs with JPlag", Resubmission to J. of Universal Computer Science, Nov. 28, 2001, <http://www.jucs.org/>, pp. 1-23.
Schleimer et al., "Winnowing: Local Algorithms for Document Fingerprinting", pp. 76-85.
Whale, "Identification of Program Similarity in Large Populations", *The Computer Journal*, 33(2):140-146 (1990).
Wise et al., "YAP3: Improved Detection of Similarities in Computer Program and Other Texts," pp. 130-134.
Cole et al. "Verifying Candidate Matches in Sparse and Wildcard Matching" [online]. Montreal, Quebec, Canada, STOC 02, May 19-21, 2002 [retrieved Oct. 30, 2007]. Retrieved from the Internet: <www.citeseer.org>, 10 pages.
Kamps et al. "Best Match Querying form DocumentCentric XML" [online]. Seventh International Workshop on the Web and Databases, Amsterdam, Netherlands, (WEBDB 2004), Jun. 17-18, 2004 [retrieved on Oct. 30, 2007]. Retrieved from the Internet: <http://staff.science.uva.nl/{mdr/Publications/Files/webdb2004.pdf>, pp. 55-60.
Meziane et al. "A Document Management Methodology Based on Similarity Contents." Elsevier, 2003, Salford, United Kingdom, Information Sciences vol. 158 (2004), pp. 15-36.
International Search Report for corresponding PCT Application No. PCT/US2007/011022, mailed Nov. 12, 2007, 4 pages.
Written Opinion for corresponding PCT Application No. PCT/US2007/011022, mailed Nov. 12, 2007, 8 pages.
Examination Report for European Application No. 06737533.7, mailed Aug. 28, 2008, 5 pages.
Invitation Pursuant to Article 94(3) and Rule 71(1) EPC for European Patent Application No. 06737533.7 dated Jun. 2, 2008, 2 pages.
Office Action issued in related U.S. Appl. No. 11/580,220, mailed Jul. 9, 2008, 9 pages.
Final Office Action issued in related U.S. Appl. No. 11/084,063, mailed Nov. 17, 2008, 16 pages.
International Search Report for PCT Application No. PCT/US2007/000272, mailed Nov. 19, 2008, 2 pages.
Written Opinion for PCT Application No. PCT/US2007/000272, mailed Nov. 19, 2008, 5 pages.
Final Office Action issued in related U.S. Appl. No. 10/728,173, mailed Jan. 23, 2009, 11 pages.
Written Opinion for PCT Application No. PCT/US2007/021648, mailed Jan. 30, 2009, 5 pages.
International Search Report for PCT Application No. PCT/US2007/021648, mailed Jan. 30, 2009, 4 pages.
Notice of Allowance issued in related U.S. Appl. No. 10/728,174 dated Feb. 4, 2009, 11 pages.
"TeleKnowledge" M2 Presswire, Coventry: Jul. 1, 2002, 3 pages.

* cited by examiner

| | (201) CONTENT | (202) COMPARISON FILE | (203) COMPARISON REGION | (204) FLAGS |
|---|---|---|---|---|
| (210) | 65 92 85 58 AE 29... | M1.C | 511-530 | 10 |
| (211) | 44 83 91 98 FF 24... | M1.C | 511-530 | 10 |
| (212) | 38 93 22 E0 41 33... | M1.C | 531-550 | 20 |
| (213) | 94 80 00 30 EF 11... | M1.C | 571-590 | 4F |
| (214) | 84 80 00 22 C0 52... | M1.C | 571-590 | 4F |
| (215) | 33 12 AA 47 A1 00... | 2A764.C | 961-980 | 20 |
| (216) | 44 83 91 98 FF 24... | 2A764.C | 981-9A0 | 20 |
| (217) | 98 42 65 33 10 CA... | 2A764.C | 9A1-9C0 | 1F |
| (218) | 13 13 99 00 12 21... | ab_off.C | 223-242 | 10 |
| (219) | 44 83 91 98 FF 24... | ab_off.C | 243-262 | 10 |
| (220) | 38 03 52 22 73 94... | ab_off.C | 263-282 | 10 |

| | (251) CONTENT | (252) EXAMINED FILE | (253) REGION | (254) FLAGS |
|---|---|---|---|---|
| (260) | 31 43 21 93 DA BC... | EXA.C | 131-150 | 10 |
| (261) | 44 83 91 98 FF 24... | EXA.C | 131-150 | 10 |
| (262) | 38 93 22 E0 41 33... | EXA.C | 151-170 | 20 |
| (263) | 94 80 00 30 EF 11... | EXA.C | 171-190 | 4F |
| (264) | 30 38 33 42 3A 00... | EXA.C | 191-1B0 | 20 |

FIG. 4

METHODS AND SYSTEMS FOR REPORTING REGIONS OF INTEREST IN CONTENT FILES

TECHNICAL FIELD

The invention generally relates to the analysis of content files. More particularly, the invention relates to methods and systems for reporting regions of interest in content files based upon an inspection and comparison of the content files.

BACKGROUND

Digital documents, files, and media may all be easily copied. Such copying of information may not be immediately apparent on its face; however, such copying can often prove to be problematic if it is initially undetected, but later discovered by a party having legal rights in the copied information.

To take an example, unlike in traditional software development environments where a single entity controls the entire development of a software element, in collaborative development environments the software elements being developed are shared among a variety of entities. Accordingly, when one develops software in a collaborative environment, copying is more difficult to detect. As such, the risk that the legal rights of another entity will be infringed, for example by developers inappropriately importing the other entity's constituent software elements into their aggregated software product, is increased.

Techniques have been developed to identify portions within an aggregated software product that are suspected of having been copied. The suspected source or sources of the copied sections may also be indicated. For example, it is known to compare portions of an aggregated software product, and/or subsets of information derived from the aggregated software product, against a database of constituent software elements and/or subsets of information derived from the constituent software elements. If the comparison yields a match or matches, it is likely that the portion of the aggregated software product being compared against the database was copied from one or more of the constituent software elements.

Problems can arise, however, where the number of constituent software elements included within the database is large and, for example, multiple versions and/or copies of one or more of the constituent software elements exist within the database or multiple ones of the constituent software elements include the same or very similar functions, procedures, and/or sub-programs. In such exemplary situations, comparing portions of an aggregated software product, and/or subsets of information derived from the aggregated software product, against a database of constituent software elements and/or subsets of information derived from the constituent software elements can result in an unwieldy large number of matches. A user inspecting an aggregated software product for potential copying may, when presented with too many possible sources from which a given portion of the aggregated software product may have been copied, become frustrated, especially if the user can not himself efficiently and easily narrow down the number of possible sources.

SUMMARY OF THE INVENTION

The present invention relates to methods and systems for automatically narrowing the number of possible sources to which a given portion of an examined content file is similar and, accordingly, for reporting regions of interest in the examined content file. The content file(s) under examination may be, for example, one or more of a software element (e.g., a source code file and/or an object code file), a multimedia presentation, a video segment, an audio segment, a textual representation, a work of art, a visual representation, a technological know-how, a business know-how, and a contract right that may be, for example, legally-protectable under patent law, copyright law, trademark law, trade secret law, contract law, and/or under other bases. The regions of interest in the protectable content may be sections of the protectable content that are suspected of having been copied, that are likely to have been copied, and/or that are identified as having been copied, or may be sections of the protectable content that are of interest for other reasons.

In one aspect, the invention features a method for providing an indication of similar content. The method includes examining a content file, identifying a first portion of the examined content file that is similar to a portion of a first comparison content file, identifying a second portion of the examined content file that is similar to a portion of a second comparison content file. The method also include determining whether one of the first portion and the second portion of the examined content file is a superset of the other, such that the first portion is entirely included in the second portion, or the second portion is entirely included in the first portion. If so, the method includes determining that the portion of the comparison file that matches the superset is a best match with the first content file. The method also includes providing an indication that the examined content file is similar to the best match.

Various embodiments may include some or all of the following features.

The method may include determining whether the first portion and the second portion of the examined content file are substantially the same, and if so, determining which of the first comparison content file and the second comparison content file is a best match using additional information about the comparison files. The first portion may be identical, approximately the same, or similar to the second portion.

The information about the comparison files may include one, two or more of the following information: information about other matches with the collection associated with the comparison files, information about directory and/or file names associated with comparison files, information about date information associated with the comparison files, license information associated with the comparison files, an indicator that a comparison is believed to be an original, and an indicator that a comparison is not an original. The information may be used separately, or in combination with other information.

Similarity may be determined by any suitable technique or techniques, alone or in combination with others. A few examples include, but are not limited to comparing tokens, comparing content, comparing data derived from content, comparing text strings, and comparing license text.

In one embodiment, the first portion and the second portion of the examined file overlap. In one embodiment, the method includes determining whether the first portion and the second portion are partially overlapping (e.g., overlapping, but neither is a superset), and if so, identifying the best matches for the portions that are different.

The first portion may be contiguous or non-contiguous. Likewise, the second portion may be contiguous or non-contiguous. The first portion may be any size, including the entire file. The portions may be portions of content in any form, such as binary, ascii, etc., and may be formatted in any manner, such as into records, or subgroups, lists, and so on.

In various embodiments, there may be three, four, or more portions that match portions of comparison files. For example, the method may include identifying a third portion of the examined content file that is similar to a portion of a third comparison content file, and determining whether one of the first portion, the second portion and the third portion of the examined content file is a superset of one or more of the others, and if so, determining that the portion of the comparison file that matches the superset is a best match with the first content file. This may be extended to a fourth, fifth, sixth, and so on.

There may be one best match or a larger number of best matches. For example, there may be two, three, or more are best matches.

In one embodiment, the method includes displaying information identifying the comparison file that is the best match. This may include displaying additional information about the comparison file that is the best match. In one embodiment, the method may include displaying information about other matches upon request.

In general, in another aspect, the invention relates to a method for providing an indication of similar content. In one embodiment, such a method includes examining a content file, identifying a first portion of the examined content file that is similar to a portion of a first comparison content file and a portion of a second comparison content file, determining whether the first comparison content file and the second comparison content file are in the same collection, and if so, selecting one of the first comparison content file and the second comparison content file as a best match with the examined content file because it is a representative match. The method may include providing an indication that the examined content file is similar to the representative match. In this way, the best match is selected because it is a representative match, and is selected to be representative because it is one of a number of files in the same collection. In another embodiment, a representative match is selected that shares the same licensing information with other matches.

The method may also be extended to portions of collections. In one embodiment, a method for providing an indication of similar content, may include examining a collection of content files, and identifying a first subset of a collection of comparison content files that are similar to a first subset of the examined content files. The method may include identifying a second subset of a collection of comparison content files that are similar to a second subset of the examined content files. The method may include determining whether one of the first subset of comparison content files and the second subset of comparison content files are a superset of the other, and if so, determining that the subset of the collection of comparison files that matches the superset is a best match with the matching subset of the examined content files. The method may include providing an indication that the subset of the collection of the examined content files is similar to the best match.

In general, in another aspect, the invention relates to a system for providing an indication of similar content. The system may implement the methods just described. In one embodiment, the system includes an examination subsystem for examining a content file, an identification subsystem for identifying a first portion of the examined content file that is similar to a portion of a first comparison content file, and identifying a second portion of the examined content file that is similar to a portion of a second comparison content file, a determination subsystem for determining whether one of the first portion and the second portion of the examined content file is a superset of the other, and if so, determining that the portion of the comparison file that matches the superset is a best match with the first content file, and an indication subsystem for providing an indication that the examined content file is similar to the comparison file that is the best match with the examined content file.

The system may include various systems and subsystems for implementing the method as described. For example, in one embodiment, the system includes a determination subsystem that determines whether the first portion and the second portion of the examined content file are the same, and if so, determines which of the first comparison content file and the second comparison content file is a best match using additional information about the comparison files. In some embodiments, the determination subsystem determines whether the first portion and the second portion are partially overlapping, and if so, identifies the best matches for the portions that are different.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 4 depicts another exemplary comparison between an examined file and several comparison files in accordance with an embodiment of the invention;

DESCRIPTION

Figure 1:
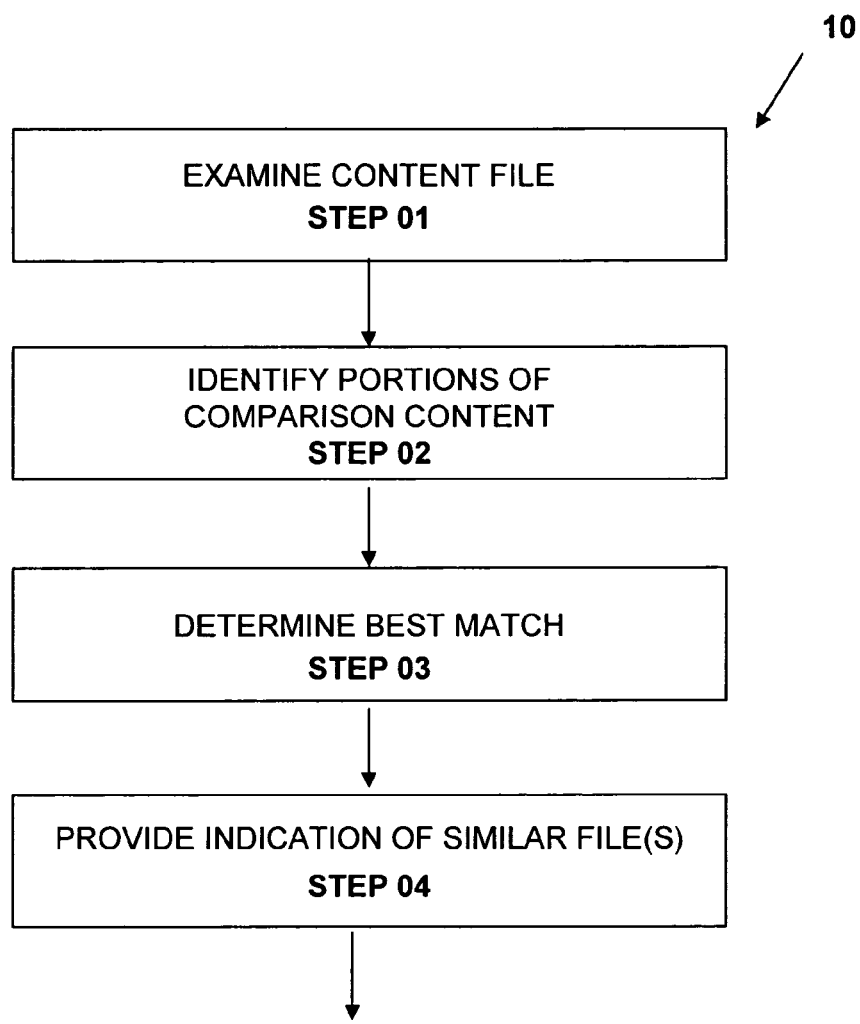
FIG. 1 is a flowchart of an embodiment of a method.

A content management system is provided that identifies similarity in content files, by examining content files and identifying and reporting similarity between the examined content files and other files. Regions in the files that are similar may be regions of interest in that they indicate that copying may have taken place. For example, a content developer who is interested in verifying that all content files have been used appropriately may use such a content management system to determine whether any content has been copied from known sources. This can be useful for source code management.

There are many different techniques that can be used to identify similarities between content files. Some of these techniques include comparing the tokens in, the structure of, the flow of execution of, the copyright notices in, the license information in, the license text in, the text strings or larger sections of text in, and/or the symbol tables in the examined file or a sub-portion thereof to those in or of one or more other content files (referred to as comparison files) or sub-portions thereof.

In one embodiment, the content management system has a large number of comparison files that are of known origin. Those comparison files can be used for comparison with the examined files, to see whether there are any portions of the examined files that are similar to any portions of the comparison files. The comparison files may be, for example, publicly available files, files within a company's own possession, or files provided by a third party for comparison. The comparisons may be accomplished by using the files themselves, or by using data calculated from the files.

Generally, a region of interest in an examined file may be identified by its location and size within the examined file. The region may be determined to match (e.g., within a predetermined threshold of similarity) a comparison file region that also has a location and size. It may be useful, in the context of such a content management system, to provide a user of the content management system with an indication about which portion of an examined file is similar to a comparison file. Such an indication may include specification of the location and size of the matching portions of the examined and comparison file. Such an indication may include further information about the comparison file, such as the license terms, whether the user is entitled to a license, and any potential license conflicts. The indication may also include any other useful information about the comparison file. To give some examples: the project of origin, a web site or other contact information for the project authors or owners, support suppliers, export restrictions, royalty or other payments required for use, alternatives to the comparison files that are known to be available, test results, project usefulness ratings, security problems and/or vulnerabilities, later available versions, available modifications, and so on.

It may be possible, however, for a region of interest in an examined content file to be similar to a portion of a first comparison file, and also similar to one or more portions of other comparison files.

In the circumstance that a portion of an examined file is similar to portions of multiple comparison files, it may be helpful to provide the user with an indication of all the portions of all the files that are similar. In some circumstances, however, it is more helpful to identify the best match or matches, rather than all of the files that have similar portions. For example, if the comparison files include multiple versions of the same file, the user may be interested in only the version that is the best match. As another example, if there are multiple copies of the same file, the user may only need to see an indication of one of the copies. Likewise, if there is other information available in addition to the determination of similarity, and that information suggests that one of the comparison files is more likely to be the source of the identified content than the other comparison files, or that it is the best match, then it can be beneficial to provide only an indication of the comparison file that is the best match. This simplifies the communication to the end user, and reduces effort to be undertaken by a person in confirming the match.

For example, it may be possible for a portion of a first examined file to be similar to a portion of a second file, while a larger, overlapping portion of the first examined file (that includes the first portion) is similar to a portion of a third file. The larger portion is indicative of a better match, in that more of the file is similar. This might happen, for example, if the second file and the third file each were derived from the same source, or if one was derived from the other.

A number of techniques are described here that will aid a content management system in identifying a region of interest in a comparison file that is the best match with a region in an examined file. These techniques may be use separately or in combination, to identify a representative region, file, or collection of files. In general, the techniques are described by way of simplified example, and should be understood to have a wide range of applicability.

Referring to FIG. 1, in general, in one embodiment, a method 10 for providing an indication of similar content includes examining a content file (STEP 01). As described, the content file may be examined by any suitable method, including but not limited to those described here. Each examined content file is examined by comparing the content, or information generated or derived from the content, to comparison content files. The comparison content files are found in a library of comparison file that is available to the system.

The method includes identifying portions of the examined content file that match portions of comparison files (STEP 02). For example, a first portion of an examined content file may be identified as similar to a portion of a first comparison content file, and a second portion of the examined content file identified as similar to a portion of a second comparison content file.

The method includes determining which of the comparison content files is best match with the examined file (STEP 03). In the case in which there are two comparison files that match, for example, the method includes determining which of the first comparison content file and the second comparison content file is the best match with the examined content file.

The method further includes providing an indication that the examined content file is similar to the comparison file that is the best match with the examined content file (STEP 04). This indication may be useful to allow a user to examine the examined file and the comparison file to verify that the content is similar and to take appropriate measures if it is similar.

Figure 2:
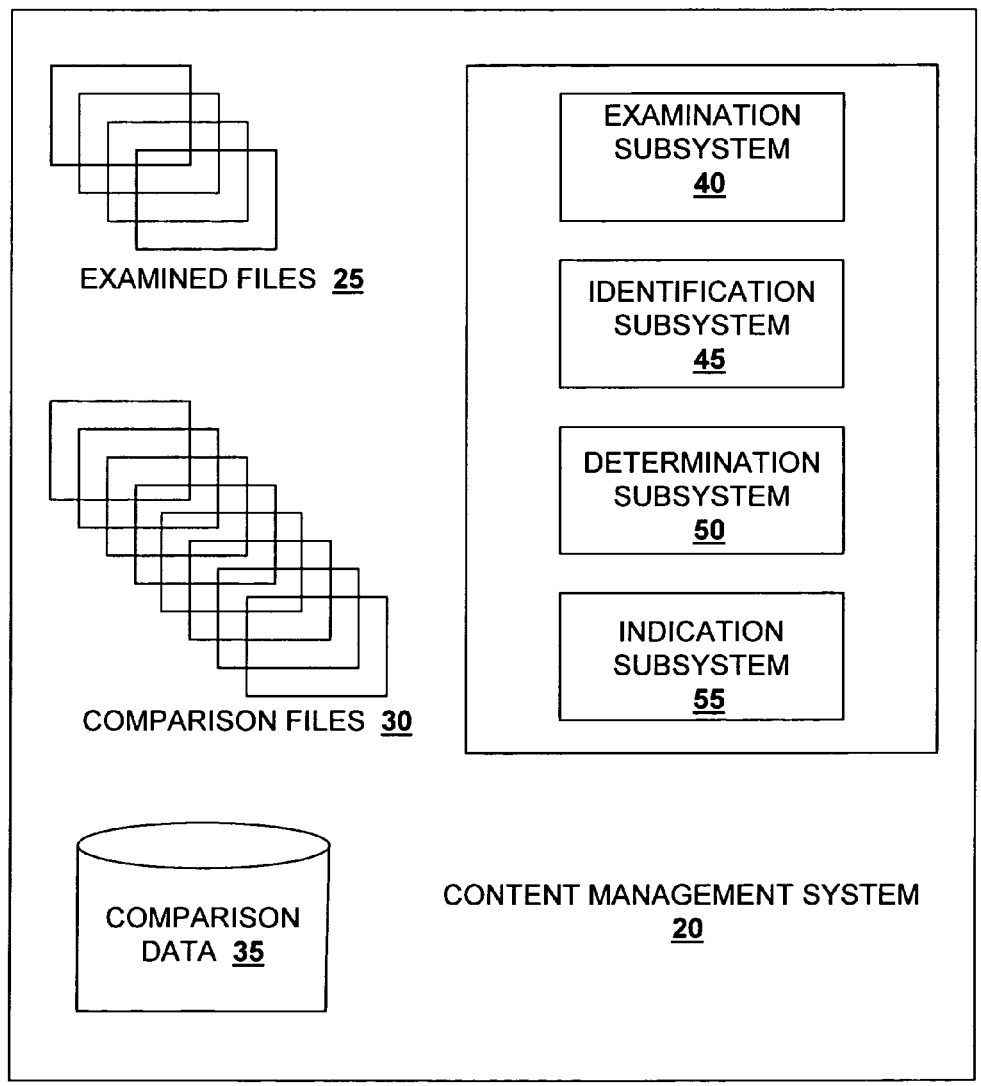
FIG. 2 is a block diagram of an embodiment of a content management system.

Referring to FIG. 2, in general, in one embodiment, a content management system 20 according to an embodiment the invention may include software running on a general-purpose computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH OS X operating system from Apple Computer of Cupertino, Calif., and various varieties of Unix, such as SUN SOLARIS from SUN MICROSYSTEMS, and GNU/Linux from RED HAT, INC. of Durham, N.C. (and others). The system 20 could also be implemented on such hardware as a smart or dumb terminal, network computer, wireless device, wireless telephone, information appliance, workstation, minicomputer, mainframe computer, or other computing device that is operated as a general purpose computer or a special purpose hardware device used solely for serving as a content management system 20.

The content management system 20 includes or has access to examined content 25, which may be any sort of content. The content management system 20 includes or has access to comparison content 30. The comparison content 30 may be accessed directly, or may be processed in or stored in the form of comparison data 35. Such comparison data 35 may include a database or other collection of information that describes, or is generated from or derived from the content. The comparison data 35 may be used by the other parts of the system to quickly identify matches.

The content management system 20 includes an examination subsystem 40. The examination subsystem examines a content file to process the content for identification. The examination subsystem, for example, may calculate data that is derived from the examined content, for comparison with the comparison content 30 and/or the comparison data 35.

The content management system 20 includes an identification subsystem 45 for identifying portions of content files that are similar to comparison files. The identification subsystem 45 may use data that is generated by the examination subsystem 40 to compare the examined content files with the comparison files. In one embodiment, the identification subsystem 45 uses data calculated using content from the examined content 25 and compares it to comparison data 35, which has been calculated in a similar way, and indexed for fast retrieval. In one such embodiment, after a first identification using calculated comparison data 35, the identification subsystem 45 performs a comparison using the actual content, to identify specifically any overlap.

In one embodiment, the identification subsystem 45 may identify a first portion of an examined content file that is similar to a portion of a first comparison content file and a second portion of the examined content file that is similar to a portion of a second comparison content file. There may be other portions of other files that are also identified.

The content management system 20 also includes a determination subsystem 50 for determining which of the first comparison content file and the second comparison content file is the best match with the examined content file. This can be accomplished in any suitable manner. For example, the best match may be determined by the comparison file that has the largest region that completely overlaps the matching region. If the largest portion(s) that match are the same size, then other techniques as described here may be used.

The content management system 20 further comprises an indication subsystem 55 for providing an indication that the examined content file is similar to the comparison file that is the best match with the examined content file. This indication may be a final indication, such that only the best match is indicated, or it may be an initial indication, with a capability to identify the other matching files if desired.

It should be understood that each of these subsystems may be implement by software modules, special-purpose hardware, or any other suitable fashion, and, if software, that they all may be implemented on the same computer, or can be distributed individually or in groups among different computers. There may be multiple instances of some or each of the subsystems, and they may be operated in any suitable manner.

Figure 3:
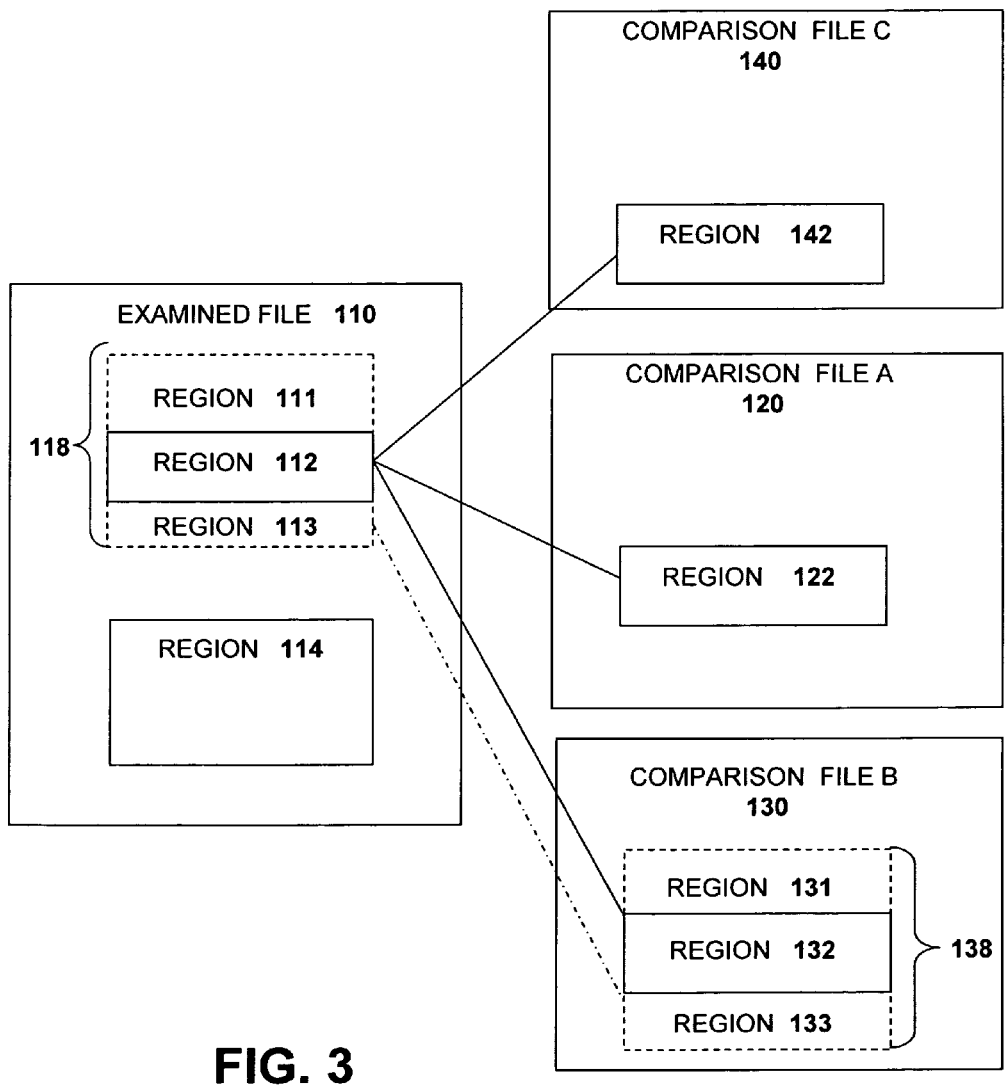
FIG. 3 depicts an exemplary comparison between an examined file and several comparison files in accordance with the invention.

Referring to FIG. 3, an examined content file 110 includes a number of regions 111, 112, 113, 114, within the content file 110. The examined file 110 is compared to comparison file A 120, comparison file B 130, and comparison file C 140. It should be understood that the number of files is exemplary, and that there could be any, and likely would be a large number of comparison files. Likewise, the examined file may be one of a number of examined files.

A first region of interest 112 in the examined file 110 is identified as similar to a region 22 of comparison file A 120. The region 112 in the examined file 110 also is found to be similar to a region 132 of comparison file B 130, and to a region 142 of comparison file C 140. Again, for clarity, only files that have overlapping regions of interest are shown, but there may be other comparison files that match, and there likely would be many comparison files that do not match.

A portion 118 of the examined file 110 that includes region 111, region 112, and region 113 includes the region 112. This portion 118 is thus completely overlapping with and contains region 112. This portion 118 is identified as similar to the portion 138 of comparison file B 130 that includes region 131, region 132, and region 133. Region 111 is similar to region 131, and region 113 is similar to region 133.

The content management tool identifies region 112 as similar to each of regions 122, 132, and 142, but the superset region 118 that includes region 111, 112, 113 is identified as a match only with the portion 138 of comparison file B 130 that includes regions 131, 132, 133. In one embodiment, portion 118 of the examined file 110 is identified as best match with the comparison content files A 120, B 130, and C 140 that match to the first examined content file 110, because the portion 118 contains the portion 112. The examined content file 110 may be identified as similar to comparison file B 130 in response to the determination that the comparison file B 130 is the best match with the comparison content files A 120, B 120, and C 140 that are similar to the first examined content file.

One factor that a tool can use in determining the best match of a number of matching files is to identify the file that contains the largest completely overlapping portion. Generally, a file that has the largest size overlapping region is "closer" in lineage to the examined file. A system may be configured to compare the location and size of each match in the examined content file, and to indicate the file that has the largest of the completely overlapping regions. It should be understood that if one region does not contain the other, that is, that if even a small portion of the matching comparison files is not overlapping, the largest may not be the best match.

For example, comparison file A might be part of a first version of a software program, and comparison file B might be part of a revised version of that software program. In such case, of the two files A and B, it is more likely that the portion 118 of the examined file 110 was copied or derived from comparison file B 130, not A 120. Likewise, region 142 of comparison file C 140 might be derived from file A 120 or from file B 130, or file A 120 or file B 130 may be derived from file C 140, but because file C 140 does not have as large an overlapping similar portion as file B 130 does, the portion 118 of the examined file 110 is much more likely to come from file B 130 than file C 140.

In some embodiments, a system may initially display only the match with the largest size overlapping region, and also provide for an additional capability to view a list of all of the portions from all of the files that are similar. In one embodiment the portions are listed in the order of the size of the overlapping similar portion. In one embodiment, only the best match is displayed.

Referring to FIG. 4, in an exemplary embodiment, exemplary excerpts 201 from portions 203 of comparison files 202 are shown. In this simplified example, the portions 203 are 20 h bytes in length, and only some of the content is shown in column 201. The locations 203 within the files 202 are shown.

In this simplified example, five 20 h byte blocks 210-214 of File M1.C are shown. Likewise, three blocks 215, 216, 217 of file 2A764.C and three blocks 218, 219, 220 of file ab_off.C are shown. It should be understood that each of these files would likely have many more blocks, and that the content 201 shown might be the actual content, or the results of operations performed on the content (e.g., specified excerpts, data calculated on the content using hash or other functions, and so on). In this simplified example, the second block 211 of file M1.C is similar to the second block 216 shown of file 2A.764.C, as well as the second block shown 219 of file ab_off.C. The other content blocks 201 shown in this example for the comparison files are not similar to each other.

Five exemplary blocks 260-264 are shown for an examined file, EXA.C. When file EXA.C is examined, the tool identifies file M1.C as having a block 211 that is similar with EXA.C block 261. File M1.C also has two other blocks 212, 213 that are similar to EXA.C blocks 262, 263. At the same time, file 2A764.C is identified as having a similar block 216 to file EXA.C block 261. Likewise, file ab_off.C is identified as having a similar block 219 to file EXA.C block 261.

In this example, the content management tool considers the similar regions, and determines that region 261 of file EXA.C is similar to regions 211, 216, and 219. The tool can determine that file M1.C is the best match of the comparison files that are similar to the examined file EXA.C because M1.C's similar portion 211 is a superset of the content that is in blocks 216 and 219, in that it also includes additional contiguous content 212, 213 that is also a match. The larger region that includes regions 211, 212, 213, contains region 211 as well as the other similar content blocks. An indication may be provided to the user that the examined file is similar to M1.C because file M1.C. is the best match of the comparison content files (e.g., M1.C., 2A764.C, and ab_off.C) that are similar to the first examined content file.

In the example above, the file M1.C was considered the best match because it had the largest contiguous region, which encompassed the region that was similar in other files. In general, a match that is a superset of other matches will be the best match. In the circumstance in which there are matches with multiple files, and the matches are the same size, other techniques may be used to identify the best match.

Non-Contiguous or Partially Overlapping Matches

For example, when considering multiple files that have matches that are the same size, a content management system may determine which file is the best match at least in part by examining the other (contiguous or non-contiguous) regions that the file is determined to be similar to. If there are a number of matches to the same file, for example, whether or not contiguous, an assumption may be made that portions of code came from that file, and not a different file.

Thus, in such an embodiment, a comparison tool may identify a region of the examined content file that is similar to a region of one or more comparison content files. The tool also may determine whether other regions of the examined content file are similar to regions of the other content files. Each of these other regions may be, for example, partially overlapping or non-contiguous. The comparison tool may determine which of the comparison content files is the best match with the examined file by determining which comparison file has the greatest amount of similar content. The system may then provide an indication that the first content file is similar to the file determined to be the best match.

The determination of which file is the best match may be based on the amount of code (e.g., number of blocks, bytes, etc.), the number of matches, other factors, and/or some combination. The determination may also be made on a more local basis within a file, so that if there are a number of matches to a particular file in the same part of the file (e.g., within a predetermined number of blocks, bytes, etc.) that would be indicative of that file, and if there were a number of matches in a different part of the file, that would be less indicative. Thus, in one embodiment, the relative distance of matching portions can be used to determine the best match.

In addition, if non-contiguous regions of two comparison files each match same-sized regions of the examined file, but one of the comparison files also has one or more other matching regions that is a superset of other matches, then the comparison file that has the superset is the best match. For example, multiple superset matches would be indicative of a file that is "closer" historically to the source of the content.

Collection Information

In one embodiment, files are associated with collections. These collections may be files associated with a particular project, program, subsystem, book, or other group. The association of files with projects may be used to determine which of a number of matching files is the best match.

For example, if a portion of a first file matches similar-sized portions of multiple files within a collection (e.g. within the same project), the indication of similarity may initially only specify one of the files. This simplifies reporting for the user, but without much additional risk from being underinclusive because the details about the collection (e.g., license, vendor, etc.) are likely to be the same for the content files in the collection. For example, collections may be organized in the comparison file library so that this is the case.

(It should be understood that if any of the matches were a superset of the others, that one would be the best match.)

In another example, if a region in a comparison file matches regions in several different examined files, and the similar regions are all (approximately or exactly) the same size, one of the regions may be selected, for example using the techniques described here (e.g., based on other matches to other regions and so on), and the other similar regions not initially indicated. For example, if there is a different region in the same comparison file that is a superset of other matches, it may be that other portions in the same file are the best match, too, and may be indicated to the user as such. This should serve to identify the match that is the most representative within a collection.

As another example, if one file has multiple regions that match with multiple regions from the same collection (as well as individual regions in files from other collections), it may be that the similar regions in the examined file are more likely to be from the collection in which there are multiple region matches, and so the files from the same collection are the best match.

In another embodiment, in which files are associated with collections, a match in a file is considered to be the best match if there are other portions in the same or related examined files that match with file(s) from the same collection. In this way, the similarity of portions of examined files to a collection of files is considered. This would be a useful case if multiple portions of content files were copied from the same source.

Example

Figure 5:
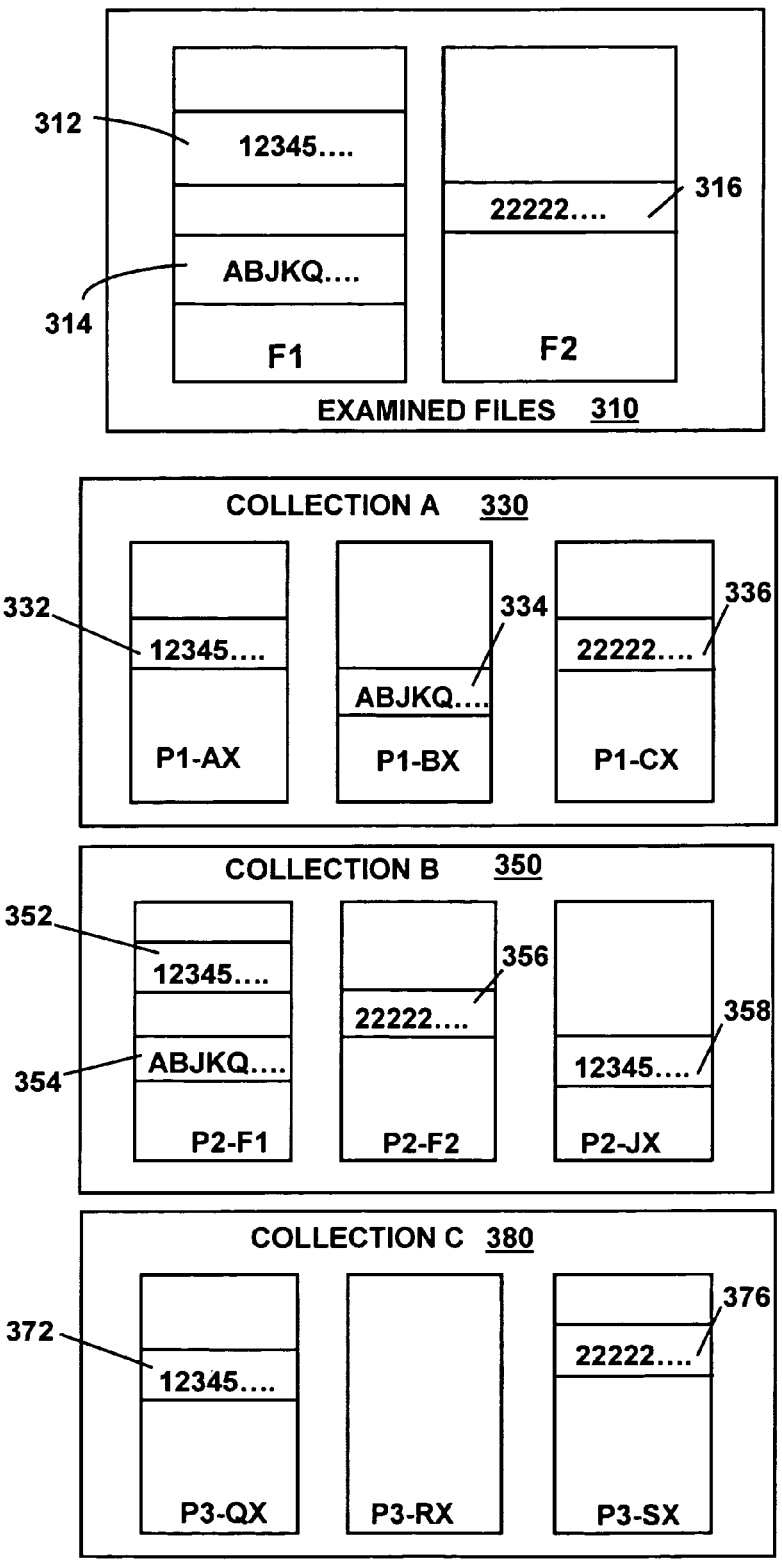
FIG. 5 depicts an exemplary comparison between an examined collection of files and several collections of comparison files in accordance with an embodiment of the invention.

Referring to FIG. 5, in a demonstrative example, examined files F1 and F2 have content that has portions that are similar to a number of other comparison files. Again, it should be understood that the number of files is exemplary, and that there could be any, and likely would be a large number of comparison and examined files, with more or less matches than as shown in this simplified demonstrative example.

The comparison files are part of various collections 330, 350, 370. As shown in the example, the portions of file F1 that match comparison files are portion 312 and portion 314.

Portion 312 of file F1 matches portion 332 of file P1-AX, portion 352 of file P2-F1, portion 358 of file P2-JX, and portion 372 of file P3-QX. Portion 314 of file F1 matches portion 334 of file P1-BX and portion 354 of file P2-F1. Portion 315 of file F2 matches portion 336 of file P1-CX, portion 356 of file P2-F2, and portion 376 of file P3-SX. There also may be other portions of other files in the same or different collection(s) that match the portions shown.

In determining which portion of the comparison files to report, the system can determine that there are at least these three different collections that include matches. As described above, if any of the matching portions of the examined file contain another, the superset match may be determined to be the best match. If the size of the matches is not determinative, for example, if the matches are (approximately or exactly) the same size, all of the matching portions can be reported, or the system can take other steps to determine which might be the best match.

In this example, portion 312 and portion 314 are in the same file, F1, and portion 316 is in a different file. The matching portions 332, 334 in collection A 330 are in two different files. In collection C, there is one portion 372 in collection C 370 that matches portion 312. In collection B, both portion 312 and portion 314 have a corresponding match 352, 352 in file P2-F1, and portion 312 also has a matching portion 358 in file P2-JX. Likewise, for portion 316, there is a match 336 in file P1-CX, a match 356 in file P2-F2, and a match 376 in file P3-SX.

Thus, in determining whether to identify both portions 352 and 358, the system can consider that the portions are in the same collection B 350. As such, only one may need to be identified. The system can also consider that non-contiguous (or partially overlapping) matching portions 352 and 354 are in the same file P2-F1, in the approximate order that they are found in examined file F1. As such, of the two portions 352, 358, the system may choose to identify only file P2-F1, because there are multiple matching portions in that file, and so it is more likely to be the best match.

In some embodiments, the system may be configured to identify only file P2-F1, and not files P1-AX, P1-BX, or P3-QX, as a match with file F1, because file P2-F1 has more regions that match than the others. In some embodiments, the system may be configured to consider the number of matches between examined files and comparison files, within a collection. In this case, there are three portions 312, 314, and 316 that match with collection A 330, and three portions 312, 314, and 316 that match with collection B 350. There are only two portions 312, 316 that match with collection C 380. As such, absent other information, the portions of collection A 330 or collection B 350 would be more likely to be the best match, because they have more matching content. The techniques can be used in combination, so that the matches from collection C are eliminated because there are only two matches, not three, and collection B selected because it has two matching portions in the same file, and so on.

In a further example that is an extension of the example just described, the collections A 330, B 350, C 380 are different versions of the same content. For example, they may be components of different releases of the same software program. For example, collection A 330 may be version 1.5, collection B may be version 2.4, and collection C may be version 1.1. If the system has information that indicates the relationship between these collections A 330, B 350, C 380, and the system determines that collection B, for example, is the best match, the risk of being underinclusive by indicating only collection B is reduced, because the collections are related.

Directory Matching

In another embodiment in which files are associated with collections, directory components may be compared to determine whether there are similarities. For example, if there are a number of files that have file and directory names that match with a particular collection, it may be determined that the files match with that collection over others.

Figure 6:
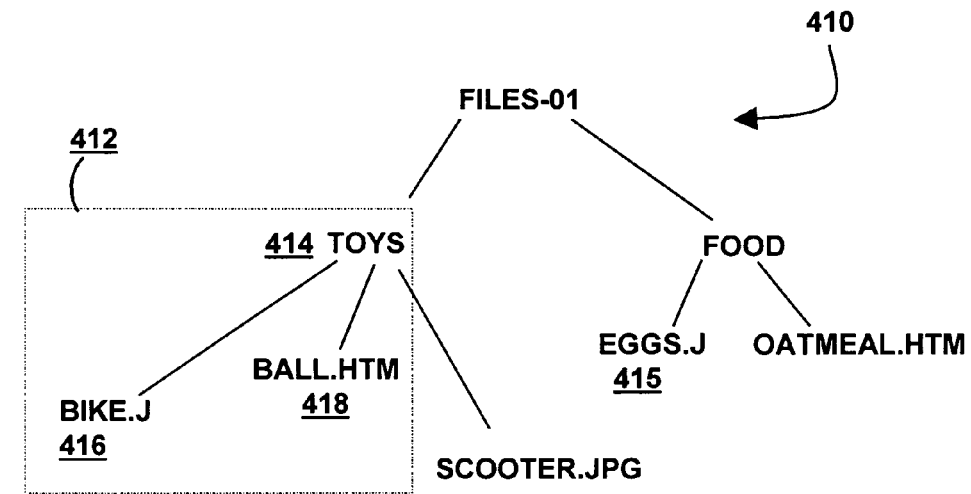
FIG. 6 depicts a comparison of file directory structure in accordance with an embodiment of the invention.
Figure 6:
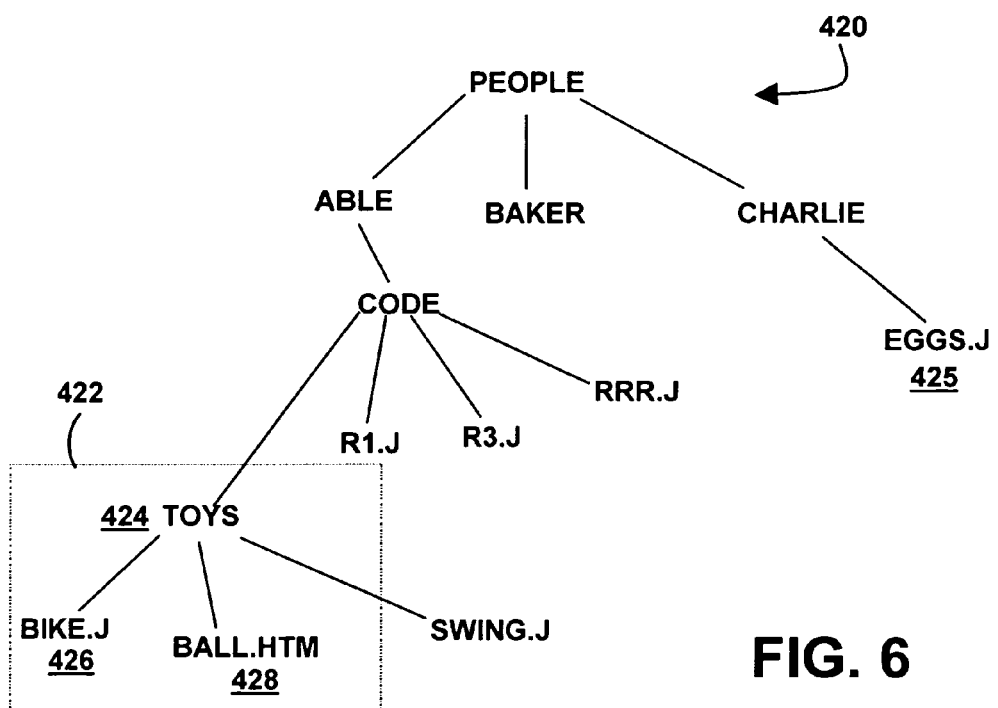

Referring to FIG. 6, an examined file set 410 and a comparison file set 420 each are shown in the form of a "tree" structure. This tree structure is a representation of the directories and files, which are typically stored in a folder or file system. It should be understood that the number of files is exemplary, and that there could be any, and likely would be a large number of examined files and comparison files. Also, there may be many different comparison file collections.

In one embodiment, an examined file set 410 includes a number of files in a directory structure. The structure includes top level directory FILES-01, which has two subdirectories TOYS (414) and FOOD. The FOOD subdirectory has files EGGS.J (415) and OATMEAL.HTM. The TOYS (414) subdirectory has files BIKE.J (416), BALL.HTM (418), and SCOOTER.JPG.

A comparison collection 420 has top level directory PEOPLE. The PEOPLE directory includes subdirectories ABLE, BAKER, and CHARLIE. The ABLE subdirectory includes a subdirectory named CODE. The CODE subdirectory includes a subdirectory named TOYS (424), and files R1.J, R3.J, and RRR.J. The TOYS (424) subdirectory includes files BIKE.J (426), BALL.HTM (428), and SWING.J. The CHARLIE subdirectory includes file EGGS.J (425).

In one embodiment, a similar file name may indicate that a file might be the best match. For example, if the EGGS.J (415) comparison file has a number of similar-sized matches with a number of files (not shown) as well as comparison file EGGS.J (425), the fact that the two files have the same name "EGGS.J" supports the conclusion that one file (e.g., EGGS.J 425) is the best match.

In one embodiment, the system determines that the examined collection of files 410 has a portion of the file and directory structure that is similar to the examined collection 420. Both the examined files 410 and the comparison collection 420 include the directory TOYS and the files BIKE.J and BALL.HTM. If, for example, the examined file BIKE.J had matches with a number of comparison files, the similarity in file and directory structure would make the one with a similar file and directory structure the best match.

Time Information

In one embodiment, when a portion of an examined file matches with similar-sized portions of multiple examined files, and the techniques above do not result in a selection of the best match, other information associated with the matched comparison files may be used. For example, in one embodiment, the date/time applicable to the comparison files (or the portions of the comparison files) are considered. An assumption may be made that the comparison file(s) with the earliest date/time are the original source of the content. For example, if one comparison file has an associated date of Jan. 10, 2005, and a second comparison file has an associated date of Jan. 20, 2000, the best match is the second comparison file, because it is more likely to be the original. This technique may be particularly relevant when the matching portions are entire files. In such case, the earlier file is most likely to be the original source, and as such, the best match.

In one embodiment, multiple versions of comparison files are available for comparison. For example, different versions of a collection of files may be available. In such case, when a match is found, the system may locate the earliest file that is a match against the portion of the content file. The system may do this for each matching comparison file, and then determine which comparison file is the earliest. By identifying the earliest version for each of the matching files, the earliest date for each may be obtained, and the earliest overall determined. This determination may be facilitated with the use of the "original" and "not-original" indicators, described below.

In one embodiment, a content management system is capable of accessing publicly available content versioning systems (e.g., cvs, subversion) for comparison files for which such access may be applicable. For example, open source projects often make their content versioning systems available for public access. When a match is discovered in a comparison file, the content management system may query the content versioning system associated with the comparison file, if available, and determine the date at which the content, as matching, was entered into the content versioning system. This date information may then be used as the earliest date information for that match, to compare with the dates associated with the other comparison files.

License Information

In some embodiments, other information associated with the matched files may be used to identify the best match. For example, the licensing information applicable to the comparison files may be considered.

In one embodiment, if the matching portions of the comparison files are covered by the same license terms, then the risk of being under-inclusive may be considered lower, because the licensing implications are not different. In such case, one of the matches may be selected as the best match.

In one embodiment, license information that is determined or otherwise associated with the examined file is compared with license information in the comparison files. For example, if notices are found in the examined file that are indicative of content that is licensed under the GNU Lesser General Public License, the best match will be a file that is licensed under the GNU Lesser General Public License. In one embodiment, a content management system is configured to recognize certain text that is associated with a particular license. For example, the system may be configured to identify text that is similar to the notices suggested by the Apache Software License. If such notices are identified in the examined file, it is likely that the content came from a file licensed under the Apache Software License. In such case, based on the assumption that the Apache Software License information is accurate, the best match will be a file that is licensed under the Apache Software License.

In some embodiments, in addition to the associated license, the probability of the correctness of information is considered in selecting the better match. For example, if it is likely that the information associated with a particular comparison file is correct, and there are matches with other comparison files that do not deserve the same confidence, or for which the likelihood of correctness is not known, the comparison file with the higher confidence will be selected.

In one such embodiment, the likelihood of correctness for the licensing information associated with a comparison file is used to select the best match. For example, if there are multiple comparison files, a comparison file that is associated with a collection that has been reviewed carefully, and so has a high probability of having correct licensing information may be the best match, because there is more confidence that the information provided with the match is correct. For example, licensing information associated with a file may be believed to have a high probability of correctness if it is known that the licensing information was reviewed carefully, or if the collection that the file is in has a reputation for careful attention to licensing matters.

Referring again to FIG. 4, each portion of content in a comparison file may be associated with one or more data elements 204. In one embodiment, the system assigns one or more of the data elements (e.g., one or more bits or bytes) 204 to indicate whether the information regarding the relevant portion of a file is likely to be correct. In one embodiment a data element is an indicator that the information regarding the relevant portion of a file is likely to be correct. In another embodiment a data element is an indicator that the information regarding the relevant portion of a file is not likely to be correct. In another embodiment, a collection of data elements (e.g., a number of bits or bytes) represent a level of confidence in the information regarding the relevant portion of a file. The level of confidence may be based on the degree of attention that has been paid to the accuracy of the information regarding the relevant portion of a file, the reputation of the believed source of the file, or otherwise. The data elements also may be configured apply to a file or to a collection of files in the comparison library rather than to a portion.

In one embodiment, a decision about which is the best match may be made based on the substance and/or implications of the license information associated with the matching portions of comparison files. For example, in one embodiment, that implements a "worst case" mode of operation, the comparison file with the most restrictive associated license is reported. Examples of restrictive licenses may include, but are not limited to, a license that requires royalty payments, a license that is limited to non-commercial use or otherwise restricts use of the content, and/or a license that has implications for content that is derived from licensed content (e.g., "copyleft"-style licenses). Thus, licenses may be evaluated as to their level of restrictiveness, and the most restrictive one or ones reported. In one such embodiment, licenses that conflict with an intended outbound license are considered to be restrictive in this context, and are reported. In one embodiment, one of the comparison files that is covered by a restrictive license(s) may be selected as the best match.

In one embodiment, in a "report each" mode of operation, one comparison file that is an example of each type of license that covers a comparison file is reported. For example, if the portion of the examined file matches with multiple files that are each covered by such licenses as the GNU General Public License, a non-commercial-use-only license, and a BSD-style license, one exemplary comparison file of each license type is reported.

In another embodiment, in a "best case" mode of operation, an assumption is made that the authors of the content are careful with regard to the licenses that cover the software that they are using. In such case, the license that is compatible with any other licenses covering matches is selected as the best match. Again using the example of a portion of an examined file that matches with multiple files that are each covered by such licenses as the GNU General Public License, a non-commercial-use-only license, and a BSD-style license, it would be appropriate for the authors of the code covered by the more restrictive licenses (e.g., the GNU GPL and the non-commercial license) copied the content from the BSD-style licensed file, because content licensed under the BSD license may be included in content that is licensed under the GNU GPL and the non-commercial license, but not the other way around. Thus, the assumption is made that the files are licensed appropriately, and so the best match is the license that is compatible with the others. This mode of operation may be particularly effective if the licensing for the comparison files has been previously reviewed, or if there is other reason to believe that the license information with respect to that comparison file is accurate, as described above.

In one embodiment, a content management tool uses one of the "best case," "report each," and "worst case" modes of operation. In one such embodiment, the choice of which mode to use is configurable by a user. In another such embodiment, a tool only uses the "worst case" mode.

Original and Not-Original Flag

Referring again to FIG. 4, each portion of content in a comparison file may be associated with one or more data elements 204. In one embodiment, the system assigns one or more of the data elements (e.g., one or more bits) 204 to indicate whether the relevant portion of a file is original. In one embodiment a data element is an indicator that the relevant portion of a file is the original. In another embodiment a data element is an indicator that the relevant portion of a file is not the original. In other embodiments, the flags may be configured apply to a file or to a collection of files in the comparison library rather than to a portion.

A "not-original" indicator may be used to signal the system to select another file to be a match in the case that there are multiple matching portions. This is particularly useful when new comparison files are added to a system that are known to be duplicative of others. This facilitates, for example, easy loading of multiple versions and/or copies of collections of files that include copies of content files already in the library of comparison files, without confusing the results.

In one embodiment, as content files are added to the comparison file library, they are examined. Matches are identified, and if a content file is determined to be identical to the content file in the library, one of the files may be identified as the original, or one of the files may be identified as not original.

If, for example, a collection is added to the comparison library, and all of the files in the collection are identical to another collection, the system may inform the operator that there is a duplicate collection. In such case, one or the other may be identified as "original" or as "not-original." This might happen where duplicate content was obtained from a different source.

It is also possible, for example, for a user, when loading content into the library of comparison files, to specify upon loading that the content files are "not original." This would be particularly beneficial in the circumstance where a collection of collections (e.g., a distribution of many different projects, such as a distribution of the Linux operating system and related programs, just as one example). It may be the case that the collection flagged as "not original" may be the only copies of such files in the library of comparison files, and it may be the case that the files flagged "not original" are different from other copies that were presumed to be identical. In such case, the techniques described above may be used to identify the best match. In one embodiment, the "not original" flag and the "original" flag are consulted only when the system is faced with identical matches that are not otherwise resolvable, for example with the other techniques described here.

Match Tracking

In one embodiment, when a system identifies a match with a file, the system maintains the link with that matched file, even after the matched file changes. For example, if a first portion of a first file is determined to be similar to a second portion of a second file, the record of the match of the first portion with the second portion is maintained, even after the first portion is modified. The first file may later be modified significantly, but the match is kept, such that the association between the two is not changed, even as they are no longer as similar.

In one embodiment, if new comparison files are added, the system may still report only the one match, because it has already been resolved. In another embodiment, the system may also determine whether any newly files are a superset match than the original, according to the techniques described above. In one embodiment, the file (and/or the matching portion and/or some surrounding portion) as matched is stored for use in future comparison. Storage of the original matching portion may be helpful if the file changes. In general it may be useful to track matches in an examined file set once they are identified, so that it is possible to maintain the knowledge about the origin of the content even after it has been further modified. Likewise, if content is copied from a portion of a file to another, the link with the matched content may be maintained.

In addition, once a match has been identified, and resolved (e.g., determined not to be a concern) it may be useful for the content management tool to recognize that, and not report it again to the user. In one embodiment, the system may also determine whether any new files are a superset match, or otherwise a better match, according to the techniques described with respect to FIG. 1, using the modified text and/or the original stored text.

This may be particularly useful if the comparison file was copied from a file that is later added to the library of comparison files.

Figure 7:
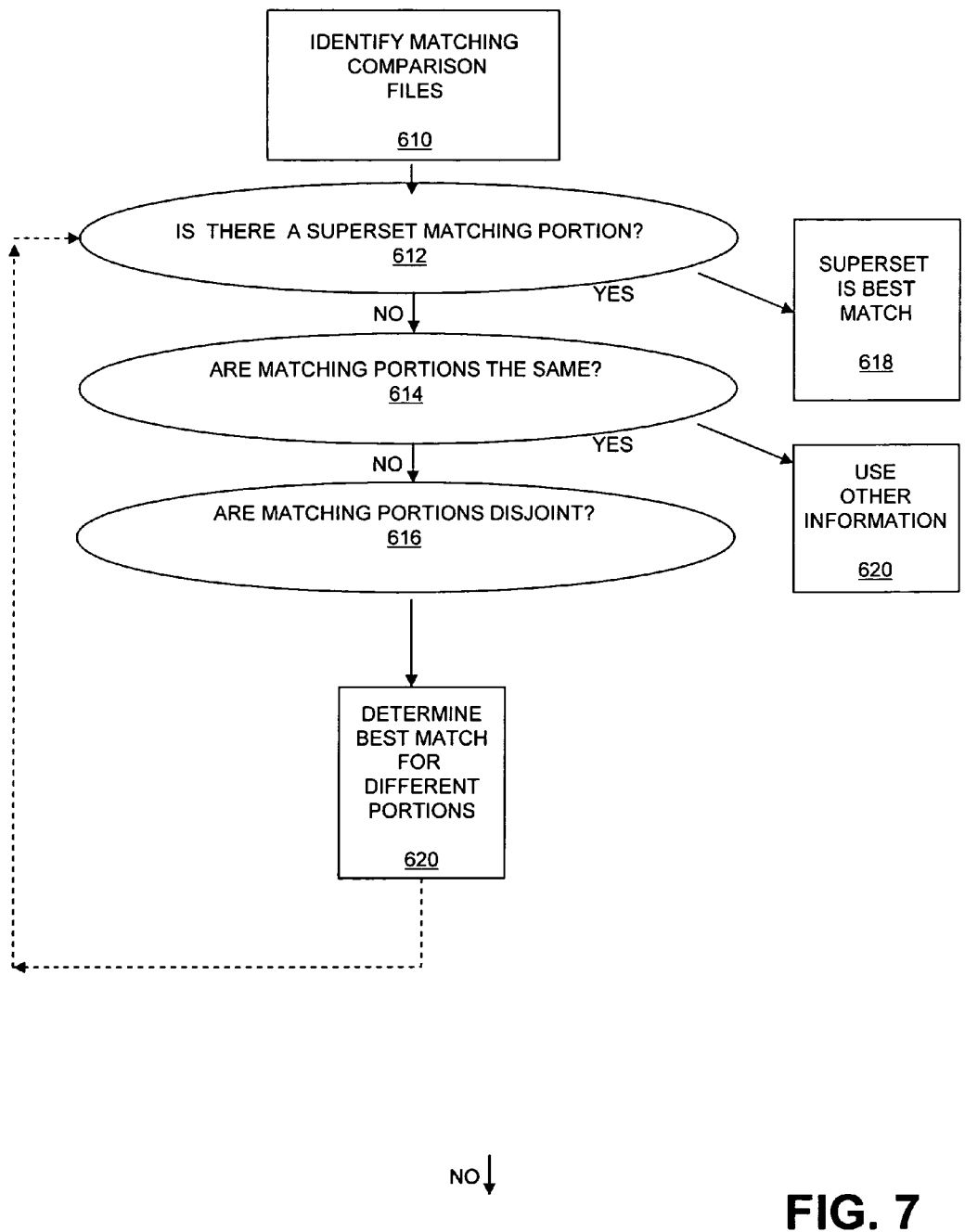
FIG. 7 depicts another flowchart of an embodiment of a method.

Referring to FIG. 7, in one embodiment, a content management system examines a content file. The content management system identifies 610 portions of the examined content file that matches comparison files. The content management system identifies, for example, a first portion of the examined content file that is similar to a portion of a first comparison content file, and a second portion of the examined content file that is similar to a portion of a second comparison content file. The first and second portions may be the same portions or different portions. If they are different, they may be different but overlapping, or one might be a superset of the other.

The content management tool determines 612 whether one of the first portion and the second portion of the examined content file is a superset of the other. The first portion is a superset of the second portion, for example, if the second portion is entirely included in the first portion. Likewise, the second portion is a superset of the first portion if the first portion is entirely included in the second portion. If one is a superset of the other, the method includes determining 618 that the portion of the comparison file that matches the superset is a best match with the first content file.

If the neither is a superset of the other, but the first portion and the second portion are the same, than other information may be used to determine the best match. In this case, the techniques described herein may be used to determine the best match. Any number of the techniques may be used, as suitable to determine the best match. The techniques may be used alone or in combination. The information that may be used may include, but is not limited to information about other matches with the collection associated with the comparison files, information about directory and/or file names associated with comparison files, information about date information associated with the comparison files, license information associated with the comparison files, an indicator that a comparison is believed to be an original, and an indicator that a comparison is not an original. Such information may be used separately, or in combinations of two, three, or more, and/or with other information.

Figure 8:
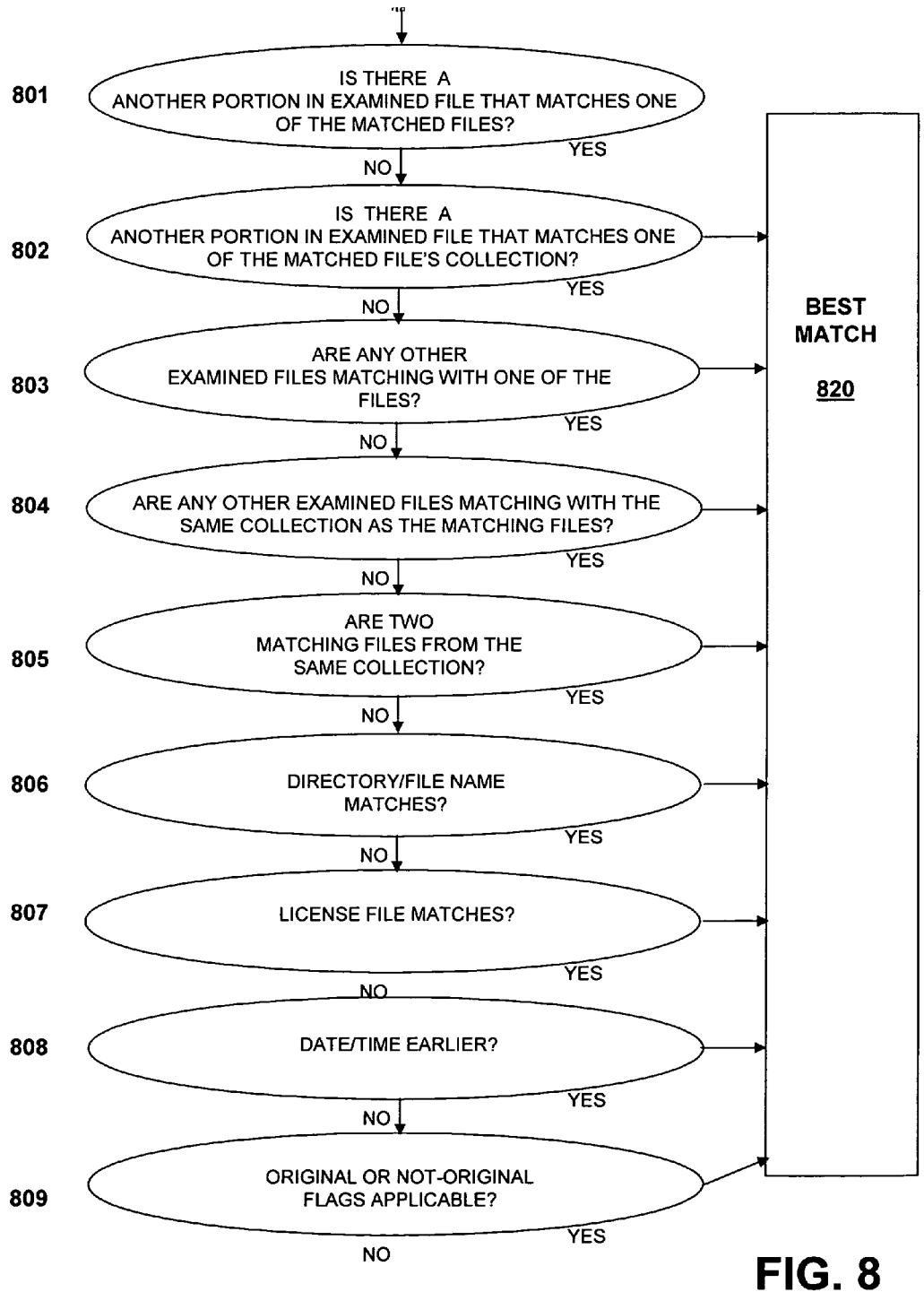
FIG. 8 depicts another flowchart of an embodiment of a method.

Referring to FIG. 8, as one exemplary embodiment, a content management system determines whether there is another portion in the examined file that also matches with one of the matched files 801. If there is, that file or files may be the best match. If there is not one, then the content management system determines whether another portion in the examined file matches of the files in the same collection as the matched file 802. Again, if there is, that file may be the best match. If there is not, then the content management system determines whether any related examined files match with the matched file 803, or the matched file's collection 804.

If there is still not a best match, the content management system may determine whether there are two matching files from the same collection 805, if so, one may be selected as the best match. If not the content management system may determine whether there are file name and/or directory matches between examined file(s) and comparison file(s) 806. If not the content management system may determine whether there are any licensing similarities, or whether the licensing information would indicate which is the best match 807. If not, the content management system may determine which of the matches is the earliest 808, and if not, whether any of the original or not-original flags may be applicable 809. It should be understood that these steps may be performed in any order, and they may be performed in various combinations.

If the matching portions are not the same, such that the first portion and the second portion are partially overlapping 616, e.g., overlapping, but not the same, and one is not a superset of the other), the content management tool may determine this, and the content management system may determine the best match for each part of the portions 622.

Techniques for Identifying Similarity Between Content Files

Any suitable technique that is helpful in identifying a region of similarity between an examined file and a comparison file may be used by the content management tool. Various embodiments of the techniques are described below. It should be understood, however, that the features of the various techniques described below are not mutually exclusive; they can exist in various combinations and permutations, even if such combinations or permutations are not made express herein, without departing from the spirit and scope of the invention. For example, the content management tool may employ one of the techniques described below, or two or more of the techniques described below, for example in combination. It will be understood by one of ordinary skill in the art that some of the techniques described below may be performed by the content management tool itself or by the content management tool in combination with a database server, even if it is not expressly stated as such. Moreover, it will be understood by one of ordinary skill in the art that the various described manners of inspecting the examined file may similarly be employed to inspect the one or more comparison files prior to comparing the examined file to the comparison file. Alternatively, rather than also inspecting the one or more comparison files in the manner described for the examined file, once the examined file is inspected and the relevant data or information extracted therefrom, the one or more comparison files may be searched for such specific data or information to identify matches between one or more regions within the examined file and one or more regions within one or more of the comparison files.

In one embodiment, the content management tool inspects tokens in the examined file. Where the examined file is computer code, the content management tool may inspect tokens derived from the source code or from the object code of the computer code. The tokens can take a variety of forms. For example, in one implementation, the content management tool breaks the source code or object code down into discrete subsets of code and then, for each discrete subset of code, evaluates a hash function to generate a hash value. Optionally, the generated hash values, or a subset thereof, may then be transmitted to a database server. Either the content management tool or the database server, if involved, may then compare the hash values against a collection of known, or recently evaluated, hash values for discrete subsets of code within the comparison files. The comparisons may yield a match between one or more regions within the examined file and one or more regions within one or more of the comparison files.

In another exemplary implementation using tokens, the content management tool generates a token for each word, or symbol, in the computer code. Each word or symbol has an assigned token. The code is thus translated to tokens, which tokens are then compared, for example individually, summarily (i.e., some but not all), or in proximate groups, to the comparison files, which may yield a match between one or more regions within the examined file and one or more regions within one or more of the comparison files.

In another exemplary implementation, the content management tool generates a token for each item in the code, in a manner similar to tokens generated by a compiler. For example, each token may include a pair of integers, where the first integer is the class of token representing a code element (e.g., START, END, FUNCTION CALL, SYMBOL, CONSTANT, LITERAL, OPERATION, etc.) and the second integer identifies the member of the class (e.g., for class OPERATION, members can include without limitation ADD, SUBTRACT, COMPARE; and for class SYMBOL, the token member might be the string name of the symbol, or an identifier assigned to the string name). The tokens that are generated may then be compared to tokens for the comparison files, for example individually or in adjacent or nearby token groups, which may yield a match between one or more regions within the examined file and one or more regions within one or more of the comparison files. In some embodiments, for some symbol classes, only the token class types are compared. For example, for CONSTANTS and LITERALS, it may be enough to know that a CONSTANT occupied a location between an OPERATION/ADD token and an OPERATION/MULTIPLY token. The combination of some token members, in proximity to some token classes, for example, may be indicative of a match between one or more regions within the examined file and one or more regions within one or more of the comparison files. Use of this technique enables the content management tool to identify code that is functionally equivalent, but has been subject to non-functional, textual changes such as a global search and replace of variable names.

As another example, for Java code, the code for each of the examined file and the comparison files may be compiled into bytecode tokens, and the compiled bytecode tokens compared. Although the compiled output may be compiler specific, if the same Java compiler is used to generate the tokens that are used for comparison, any anomalies due to compiler differences can be minimized. As in the example above, if desired, steps can be taken to minimize the impact of any non-functional, textual differences, such that the comparison focuses on functional similarity as represented in a group of adjacent or nearby tokens.

In one embodiment, the content management tool inspects the structure of the examined file. For example, where the examined file is a source code file or an object code file, the content management tool may inspect the code, or subsets thereof, and generate representations of how the code is structured (e.g., representations of what certain routines, sub-routines, functions, loops, etc. use as parameters, variables, constants, etc.). The generated representations may then be compared against a collection of known, or recently generated, source code or object code structure representations for the comparison files. The comparisons may yield a match between one or more regions within the examined file and one or more regions within one or more of the comparison files.

In one embodiment, the content management tool inspects the flow of execution of the examined file. For example, where the examined file is a source code file or an object code file, the content management tool may inspect the code, or subsets thereof, and generate representations of the order in which discrete sections of the code (e.g., routines, sub-routines, functions, loops, etc.) are found and/or will be executed. The generated representations may then compared against a collection of known, or recently generated, source code or object code flow of execution representations for the comparison files. The comparisons may yield a match between one or more regions within the examined file and one or more regions within one or more of the comparison files.

In one embodiment, the content management tool inspects copyright notices in the examined file. For example, where the examined file is a source code file or an object code file, the content management tool may inspect the file and reproduce all copyright notices identified therein. The content management tool may identify such copyright notices by, for example, searching the file in a non-case-sensitive manner for the text string "copyright," searching the file in a non-case-sensitive manner for the text string "all rights reserved," searching the file in a non-case-sensitive manner for the text string "(c)," or searching the file for the symbol "C." The reproduced copyright notices may then be compared against a collection of known, or recently generated, copyright notices for the comparison files. The comparisons may yield a match between one or more regions within the examined file and one or more regions within one or more of the comparison files. Also, after having identified the copyright notices within the examined file, the content management tool may be configured to search the comparison files for those specifically identified copyright notices. Such a search may also yield a match between one or more regions within the examined file and one or more regions within one or more of the comparison files.

In one embodiment, the content management tool inspects license information, which may be incomplete, in the examined file. For example, where the examined file is a source code file or an object code file, the content management tool may inspect the file to identify all instances where license information appears. The content management tool may then reproduce certain license information from the identified instances, such as, for example, identifications of the licenses themselves and/or the types of the licenses, the scopes of the licenses, the durations of the licenses, the payments to be made under the licenses, or combinations thereof. The reproduced license information may then be compared against a collection of known, or recently reproduced, license information from the comparison files. The comparisons may yield a match between one or more regions within the examined file and one or more regions within one or more of the comparison files.

In one embodiment, the content management tool inspects license text, which may be incomplete, in the examined file. For example, where the examined file is a source code file or an object code file, the content management tool may inspect the file to identify all instances where license text appears. The content management tool may then reproduce all or certain portions of the license text from the identified instances. The reproduced license text may then be compared against a collection of known, or recently reproduced, license text from the comparison files. The comparisons may yield a match between one or more regions within the examined file and one or more regions within one or more of the comparison files.

In one embodiment, the content management tool inspects the examined file for specific text strings. For example, where the examined file is a source code file, the content management tool may inspect the file to identify the presence or absence of certain text strings, such as, for example, "Microsoft," "Eclipse," "Oracle," and "fsf.org." Where the examined file is an object code file, the content management tool may employ a hexadecimal translator to inspect the file and identify the presence or absence of certain text strings in constants. Having identified certain specific text strings, the content management tool may then reproduce the text strings and compare them against a collection of known, or recently reproduced, text strings for the comparison files. The comparisons may yield a match between one or more regions within the examined file and one or more regions within one or more of the comparison files.

In one embodiment, the content management tool filters its identification of specific text strings in the examined file and may also filter its comparison of the identified text strings against the comparison files. For example, where the examined file is a source code file, the content management tool may filter or restrict its identification of specific text strings to those which occur only in the comments or, alternatively, to those which occur only in the code. Moreover, the content management tool may filter or restrict its identification of specific text strings to those text strings that occur only in string constants or to those that occur only in the lowercase, and may treat all white-spaces, no matter how long, as equal. The query against the collection of known, or recently reproduced, text strings for the comparison files may also be filtered as such.

In one embodiment, rather than inspecting the examined file for specific text strings, the content management tool reproduces larger sections of text from the examined file, for example from the source code of the examined file, and compares those text sections against a collection of known, or recently reproduced, text sections from the comparison files. The comparisons may yield a match between one or more regions within the examined file and one or more regions within one or more of the comparison files.

In one embodiment, where the examined file is an object code file, the content management tool inspects the object code file to identify its symbol tables. Having identified the object code file's symbol tables, the content management tool may then reproduce the symbol tables themselves, or, alternatively, only its symbols, and compare them against a collection of known, or recently reproduced, symbol tables or symbols of the comparison files. The comparisons may yield a match between one or more regions within the examined file and one or more regions within one or more of the comparison files.

What is claimed is:

1. A content management system having a computer-readable memory storing executable instructions therein to provide an indication of similar content, the computer-readable memory comprising:
    instructions to examine a content file;
    instructions to identify a first portion of the examined content file that is similar to a portion of a first comparison content file, and to identify a second portion of the examined content file that is similar to a portion of a second comparison content file;
    instructions to determine whether one of the first portion and the second portion of the examined content file is a superset of the other, and if so, instructions to determine that the portion of the comparison file that matches the superset is a best match with the examined content file; and
    instructions to provide an indication that the examined content file is similar to the comparison file that is the best match with the examined content file.

2. The content management system of claim 1, wherein the first portion is a contiguous portion of the examined file.

3. The content management system of claim 1 wherein the first portion of the examined content file is identical to the portion of the first comparison content file, and the second portion of the examined content file is identical to the portion of the second comparison content file.

4. The content management system of claim 1, further comprising:
   instructions to identify a third portion of the examined content file that is similar to a portion of a third comparison content file; and
   instructions to determine whether one of the first portion, the second portion and the third portion of the examined content file is a superset of one or more of the others, and if so, determine that the portion of the comparison file that matches the superset is a best match with the examined content file.

5. The content management system of claim 4, wherein the second comparison content file and the third comparison file are both determined to be a best match.

6. The content management system of claim 1 wherein the similarity is determined by one or more of the following techniques, alone, or in combination with others: comparing tokens, comparing content, comparing data derived from content, comparing text strings, and comparing license text.

7. The content management system of claim 1 further comprising instructions to display information identifying the comparison file that is the best match.

8. The content management system of claim 1, wherein the first portion and the second portion of the examined file overlap.

9. The content management system of claim 1, wherein the instructions to determine comprise instructions to determine whether the first portion and the second portion of the examined content file are the same, and if so, instructions to determine which of the first comparison content file and the second comparison content file is a best match using additional information about the comparison files.

10. The content management system of claim 9, wherein the instructions to determine which of the first comparison content file and the second comparison content file is a best match comprise instructions to use information about other matches with the comparison files.

11. The content management system of claim 9, wherein the instructions to determine which of the first comparison content file and the second comparison content file is a best match comprises instructions to use information about other matches with a collection associated with the comparison files.

12. The content management system of claim 11, wherein the instructions to determine which of the first comparison content file and the second comparison content file is a best match comprise instructions to use information about other matches with the collection associated with the comparison files, and select the match with the collection that has the most matches with the examined file.

13. The content management system of claim 11, wherein the instructions to determine which of the first comparison content file and the second comparison content file is a best match comprise instructions to use information about other matches with the collection associated with the comparison files, and select the match with the comparison content file associated with a collection that has the most matches with the collection with which examined file is associated.

14. The content management system of claim 9, wherein the instructions to determine which of the first comparison content file and the second comparison content file is a best match comprise instructions to use information about at least one of directory and file names associated with the comparison files.

15. The content management system of claim 9, wherein the instructions to determine which of the first comparison content file and the second comparison content file is a best match comprise instructions to use date information associated with the comparison files.

16. The content management system of claim 9, wherein the instructions to determine which of the first comparison content file and the second comparison content file is a best match comprise instructions to use license information associated with the comparison files.

17. The content management system of claim 16, wherein the license information is used to determine which comparison file has a license that is most compatible with the license for the examined content file.

18. The content management system of claim 16 wherein the license information is used to determine which comparison file has a license that is most restrictive.

19. The content management system of claim 9, wherein the instructions to determine which of the first comparison content file and the second comparison content file is a best match comprise instructions to use an indicator that a comparison is believed to be an original.

20. The content management system of claim 9, wherein the instructions to determine which of the first comparison content file and the second comparison content file is a best match comprise instructions to use an indicator that a comparison is believed not to be an original.

21. The content management system of claim 1, wherein the instructions to determine comprise instructions to determine whether the first portion and the second portion are partially overlapping, and if so, instructions to identify the best matches for the portions that are different.

22. A content management system having a computer-readable memory storing executable instructions therein to provide an indication of similar content, the computer-readable memory comprising:
   instructions to examine a collection of content files;
   instructions to identify a first subset of a collection of comparison content files that are similar to a first subset of the examined content files;
   instructions to identify a second subset of a collection of comparison content files that are similar to a second subset of the examined content files;
   instructions to determine whether one of the matching first subset of comparison content files and the second subset of comparison content files are a superset of the other, and if so, to determine that the subset of the collection of comparison files that is determined to be a superset is a best match with the matching subset of the examined content files; and
   instructions to provide an indication that the subset of the collection of the examined content files is similar to the best match.

* * * * *